United States Patent
Ko et al.

(10) Patent No.: US 9,609,378 B2
(45) Date of Patent: Mar. 28, 2017

(54) IP CAMERA, COMMUNICATION METHOD AND COMMUNICATION SYSTEM

(71) Applicant: SONIX Technology Co., Ltd., Hsinchu (TW)

(72) Inventors: Chung-Chih Ko, Hsinchu County (TW); Ming-Chih Wu, Miaoli County (TW); Kun-Ming Huang, Hsinchu County (TW)

(73) Assignee: SONIX Technology Co., Ltd., Taiwan (TW)

( * ) Notice: Subject to any disclaimer, the term of this patent is extended or adjusted under 35 U.S.C. 154(b) by 0 days.

(21) Appl. No.: 14/564,101

(22) Filed: Dec. 9, 2014

(65) Prior Publication Data

US 2015/0163534 A1 Jun. 11, 2015

(30) Foreign Application Priority Data

Dec. 9, 2013 (TW) .............. 102145208 A

(51) Int. Cl.
*H04N 7/18* (2006.01)
*H04N 7/173* (2011.01)
(Continued)

(52) U.S. Cl.
CPC ......... *H04N 21/4223* (2013.01); *H04L 65/60* (2013.01); *H04N 21/2143* (2013.01);
(Continued)

(58) Field of Classification Search
CPC ............. H04N 21/4223; H04N 21/436; H04N 21/4402
(Continued)

(56) References Cited

U.S. PATENT DOCUMENTS 9,167,275 B1 * 10/2015 Daily .................. H04N 21/812
2004/0051787 A1 3/2004 Mutsuro et al.
(Continued)

FOREIGN PATENT DOCUMENTS

CN 101710975 5/2010
CN 102014122 4/2011
(Continued)

OTHER PUBLICATIONS

"Office Action of Taiwan Counterpart Application," issued on Aug. 25, 2015, p. 1-p. 8.

*Primary Examiner* — James R Sheleheda
(74) *Attorney, Agent, or Firm* — Jianq Chyun IP Office

(57) ABSTRACT

An IP camera, a communication method and a communication system are provided. The IP camera includes an image capturing unit, a video processing unit and a connection processing unit. The image capturing unit captures a plurality of consecutive images. The video processing unit is coupled to the image capturing unit, and generates a first video stream and a second video stream according to the images. The connection processing unit is coupled to the video processing unit, processes the first video stream into a first packet stream, and processes the second video stream into a second packet stream. The connection processing unit transmits the first packet stream to a local area wireless network unit through a first wireless link, and the connection processing unit transmits the second packet stream to an external electronic device through a second wireless link.

12 Claims, 2 Drawing Sheets

(51) Int. Cl.
*H04N 21/4223* (2011.01)
*H04N 21/4402* (2011.01)
*H04N 21/436* (2011.01)
*H04N 21/2187* (2011.01)
*H04L 29/06* (2006.01)
*H04N 21/214* (2011.01)
*H04N 21/2347* (2011.01)
*H04N 21/236* (2011.01)
*H04N 21/239* (2011.01)
*H04N 21/2743* (2011.01)
*H04N 21/4363* (2011.01)
*H04N 21/437* (2011.01)
*H04N 21/4408* (2011.01)
*H04N 21/61* (2011.01)
*H04N 21/643* (2011.01)
*H04W 8/08* (2009.01)

(52) U.S. Cl.
CPC ....... *H04N 21/2187* (2013.01); *H04N 21/239* (2013.01); *H04N 21/2347* (2013.01); *H04N 21/23605* (2013.01); *H04N 21/2743* (2013.01); *H04N 21/436* (2013.01); *H04N 21/437* (2013.01); *H04N 21/43637* (2013.01); *H04N 21/4402* (2013.01); *H04N 21/4408* (2013.01); *H04N 21/6175* (2013.01); *H04N 21/64322* (2013.01); *H04W 8/08* (2013.01)

(58) Field of Classification Search
USPC .............................................. 725/31, 74, 81
See application file for complete search history.

(56) References Cited

U.S. PATENT DOCUMENTS

| | | | | |
|---|---|---|---|---|
| 2006/0161960 A1* | 7/2006 | Benoit | ............. | G08B 13/19656 725/105 |
| 2006/0193534 A1* | 8/2006 | Hirose | ............. | G08B 13/19602 382/291 |
| 2009/0049491 A1* | 2/2009 | Karonen | ................ | H04L 65/604 725/105 |
| 2009/0195655 A1* | 8/2009 | Pandey | ............ | G08B 13/19647 348/158 |
| 2009/0259754 A1 | 10/2009 | Wu | | |
| 2010/0111489 A1* | 5/2010 | Presler | .................... | H04N 5/225 386/278 |
| 2011/0099286 A1* | 4/2011 | Krikorian | .......... | H04N 21/4398 709/231 |
| 2012/0026343 A1 | 2/2012 | Ezoe et al. | | |
| 2012/0044354 A1 | 2/2012 | Cheng et al. | | |
| 2012/0086767 A1* | 4/2012 | Lau | ........................ | H04N 7/148 348/14.02 |
| 2012/0169883 A1* | 7/2012 | Chang | .................... | H04N 7/181 348/159 |
| 2013/0222515 A1* | 8/2013 | Abuan | ..................... | H04N 7/14 348/14.01 |
| 2014/0043495 A1* | 2/2014 | Bateman | ................ | H04N 7/181 348/207.11 |
| 2014/0181519 A1* | 6/2014 | Rao | ..................... | H04N 7/17318 713/168 |
| 2014/0187239 A1* | 7/2014 | Friend | .................... | H04L 29/08 455/426.1 |
| 2014/0258444 A1* | 9/2014 | Joe | ..................... | H04L 67/2814 709/217 |
| 2014/0281478 A1* | 9/2014 | Huang | .................. | H04W 12/04 713/150 |
| 2015/0130935 A1* | 5/2015 | Siann | ..................... | H04N 7/185 348/143 |
| 2015/0156659 A1* | 6/2015 | Sze | .................... | H04N 21/6143 370/338 |
| 2015/0350598 A1* | 12/2015 | Yang | ..................... | H04W 24/08 348/14.02 |

FOREIGN PATENT DOCUMENTS

| TW | 201127055 | 8/2011 |
|---|---|---|
| TW | 201218770 | 5/2012 |

* cited by examiner

IP CAMERA, COMMUNICATION METHOD AND COMMUNICATION SYSTEM

CROSS-REFERENCE TO RELATED APPLICATION

This application claims the priority benefit of Taiwan application serial no. 102145208, filed on Dec. 9, 2013. The entirety of the above-mentioned patent application is hereby incorporated by reference herein and made a part of this specification.

BACKGROUND

Technical Field

The invention relates to an electronic apparatus, and particularly relates to an IP camera, communication method and a communication system.

Related Art

Generally, when a conventional IP camera is set, it has to be connected to an electronic device such as a personal computer to complete initial setting of a network before usage. When the IP camera IP camera of a wireless connection, setting thereof is more complicated, which often causes a problem to a user. In order to simplify a setting content, the IP camera of the wireless connection is probably configured with an external electronic device that also has a wireless connection and has an input/output device and a display screen, so as to facilitate the user to easily set various parameters of the network, or directly provide the user to use the display screen to view images captured by the IP camera.

When the user simply views the images captured by the IP camera by using the display screen of the external electronic device, a whole communication state thereof is a closed system state, and the images captured by the IP camera cannot be directly transmitted to the Internet through the network. In case that the IP camera is simultaneously connected to a wireless network and the external electronic apparatus, the IP camera may encounter a plurality of problems required to be resolved, one problem is that the IP camera can only selectively provide one of the links and provide the image content thereto, and another problem is that when a frequency band used by the link with the external electronic apparatus and a frequency band used by the link with the wireless network are close to each other, wireless signals transmitted through the link with the wireless network and the link with the external electronic apparatus are probably interfered with each other, and a signal transmission status is probably in a chaos, which may result in a fact that the images captured by the IP camera are unable be correctly transmitted to the external electronic apparatus or the Internet.

SUMMARY

The invention is directed to an IP camera, a communication method and a communication system, by which more than one video streams are simultaneously transmitted to an external electronic device or the Internet through a single wireless network standard.

The invention provides an IP camera including an image capturing unit, a video processing unit and a connection processing unit. The image capturing unit captures a plurality of consecutive images. The video processing unit is coupled to the image capturing unit, and generates a first video stream and a second video stream according to the images. The connection processing unit is coupled to the video processing unit, processes the first video stream into a first packet stream, and processes the second video stream into a second packet stream. The connection processing unit transmits the first packet stream to a local area wireless network unit through a first wireless link, and the connection processing unit transmits the second packet stream to an external electronic device through a second wireless link.

The invention provides a communication method, which is adapted to an IP camera, which includes following steps. First, a plurality of consecutive images are captured. Then, a first video stream and a second video stream are generated according to the images. Then, the first video stream is processed into a first packet stream, and the second video stream is processed into a second packet stream. The first packet stream is transmitted to a local area wireless network unit through a first wireless link, and the second packet stream is transmitted to an external electronic device through a second wireless link.

The invention provides a communication system including an external electronic device, a local area wireless network unit and an IP camera. The external electronic device has a display screen. The local area wireless network unit is connected to the Internet. The IP camera connects the local area wireless network unit through a first wireless link and connects the external electronic device through a second wireless link, and respectively transmits a first packet stream to the local area wireless network unit and transmits a second packet stream to the external electronic device. When the external electronic device receives the second packet stream, the display screen displays an image content of the second packet stream. The first packet stream includes a first video stream, the second packet stream includes a second video stream, and the first video stream and the second video stream correspond to the same image content.

According to the above description, the invention provides an IP camera, a communication method and a communication system, and the IP camera can simultaneously transmit the image content captured by the IP camera to the Internet and the external electronic device through wireless links.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
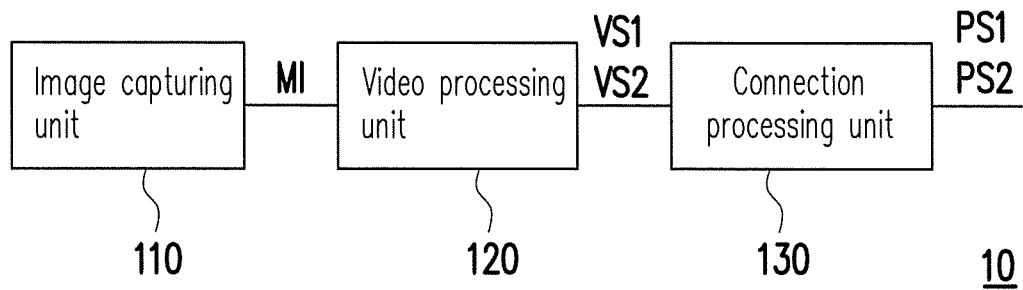
FIG. 1 is a functional block diagram of an IP camera according to an embodiment of the invention.

FIG. 1 is a functional block diagram of an IP camera according to an embodiment of the invention. Referring to FIG. 1, the IP camera 10 includes an image capturing unit 110, a video processing unit 120 and a connection processing unit 130. The image capturing unit 110 captures a plurality of consecutive images MI. The video processing unit 120 is coupled to the image capturing unit 110, and generates a first video stream VS1 and a second video stream VS2 according to the images MI. The connection processing unit 130 is coupled to the video processing unit 120, processes the first video stream VS1 into a first packet stream PS1, and processes the second video stream VS2 into a second packet stream PS2. The connection processing unit 130 transmits the first packet stream PS1 to a local area wireless network unit through a first wireless link, and the connection processing unit 130 transmits the second packet stream PS2 to an external electronic device through a second wireless link.

The local area wireless network unit can be a network node connected to the Internet such as a wireless network router, a wireless network access point, a base station, etc. The IP camera 10 can transmit the first packet stream PS1 to a specified address (for example, a network node, a server or an electronic device of a specified address) in the Internet through the local area wireless network unit and the Internet. The external electronic device is directly connected to the connection processing unit 130 of the IP camera 10 without through the Internet or the other network nodes. The external electronic device may include a display screen, a video decoder unit, a storage unit and an input and output unit, etc., and after receiving the second packet stream PS2, the external electronic device decodes and decompresses the second packet stream PS2 to obtain the second video stream VS2, and displays image content of the second video stream VS2 on the display screen and/or stores the second video stream VS2 into the storage unit. In the present embodiment, the external electronic device does not have a too high computing power and a high resolution display screen, and can be regarded as an auxiliary device of the IP camera 10. In another embodiment of the invention, the external electronic device may have a higher computer power and a high resolution display screen, which is not limited by the invention.

In the present embodiment, since the IP camera 10 does not necessarily include other input and output unit, the user can control the IP camera 10 through the input and output unit of the external electronic device, for example, to adjust various settings and configurations of the IP camera 10, etc. After the external electronic device receives the input of the user, the external electronic device can transmit an instruction including the aforementioned adjustment content to the IP camera 10. The IP camera 10 receives the instruction to perform a corresponding adjustment, for example, to adjust a photographing angle, an alarm sound, etc. of the IP camera 10.

In the present embodiment, the first wireless link and the second wireless link are complied with a same wireless local area network standard, for example, a wireless fidelity (WiFi) standard. The connection processing unit 130 distinguishes the packets transmitted by the two wireless links through different encryption methods. For example, the first packet stream PS1 transmitted to the local area wireless network unit through the first wireless link is encrypted by a first encryption method, and the second packet stream PS2 transmitted to the external electronic device through the second wireless link is encrypted by a second encryption method. In this way, when the local area wireless network unit inadvertently receives the second packet stream PS2 encrypted by the second encryption method, the local area wireless network unit cannot interpret the content of the second packet stream PS2, so as to avoid packet transmission errors to improve data security of the user.

Selection of the first encryption method and the second encryption method is determined according to an actual implementation state, and is intend to distinguish the data packets (i.e., the first packet stream PS1 and the second packet stream PS2) transmitted through the first wireless link and the second wireless link. Therefore, the first encryption method and the second encryption method may use different encryption standards to implement the encryption, or may use the same encryption standard with different keys.

For example, when the connection processing unit 130 is connected to the local area wireless network unit (to establish the first wireless link), the connection processing unit 130 can obtain an encryption standard and a key (for example, input by the user) preset by the local area wireless network unit, and the connection processing unit 130 can correspondingly set the encryption method of the second wireless link with the external electronic device. When the first encryption method selects an advanced encryption standard (AES) to implement the encryption, the connection processing unit 130 can correspondingly set the second encryption method to encrypt the data packets in the second wireless link according to a wired equivalent privacy (WEP) standard, or transmits the data packets in the second wireless link in a non-encryption manner. When the first encryption method selects the WEP standard to implement the encryption, the connection processing unit 130 can set the second encryption method to use the WEP standard to encrypt the data packets in the second wireless link by using a key different to that of the first encryption method, or can transmit the data packets in the second wireless link in the non-encryption manner, which is not limited by the invention.

In the present embodiment, the connection processing unit 130 includes a processor, and executes an embedded operating system, for example, a linux operating system to convert data streams (for example, the first video stream VS1 and the second video stream VS2) into dada packets (for example, the first packet stream PS1 and the second packet stream PS2). In a driver level processing program of the embedded operating system, before each of the packets of the second packet stream PS2 is generated, the connection processing unit 130 notes information such as an encryption method (the aforementioned second encryption method), an address of a transferring object (i.e., the network address corresponding to the external electronic device), etc., to a header of a frame of a data link layer of each packet in the second packet stream PS2 in a raw socket manner. In this way, the operating system executed by the processor of the connection processing unit 130 can encrypt the second packet stream PS2 by using the first encryption method different to the second encryption method on a physical layer according to the notes of the header, and transmit the second packet stream PS2 through the second wireless link.

Moreover, in the present embodiment, the vide processing unit 120 can simultaneously generate a plurality of video streams according to the images MI captured by the image capturing unit 110, where the video streams may have different resolutions, different frame rates and/or different image formats, and the video streams of different resolutions and/or different image formats can be generated according to a requirement of a playing end (for example, the aforementioned external electronic device, or other electronic device connected through the Internet such as a smart phone, a tablet personal computer (PC), a PC, etc.).

For example, when the first video stream VS1 is transmitted to an electronic device having a high resolution display screen and a high data computing power such as a PC, a smart phone, a tablet PC, etc. through the Internet for displaying, the first video stream VS1 can be a video stream encoded by using H.264 (or referred to as advanced video coding (AVC), and having a frame rate of 30 fps and a pixel resolution of 1920*1080. As described above, in the present embodiment, the external electronic device can be regarded as an auxiliary device of the IP camera 10, and compared with the electronic devices connected through the Internet, the display screen of the external electronic device has lower pixel resolution and lower data computing power, so that it is unnecessary to transmit the video stream with a high resolution coding format and requiring a highly complicated computing processing. Therefore, the second video stream VS2 can be a video stream having a resolution of a quarter video graphic array (QVGA), a frame rate of 20 fps and using a coding format of motion joint photographic experts group (motion JPEG). The above setting of the video streams is only an example, and is not used for limiting the invention.

In the present embodiment, the external electronic device is an auxiliary device of the IP camera 10, and the screen resolution, the maximum frame rate and decompression and decoding capability thereof are known, and various parameters for the second video stream VS2 can be preset in the IP camera 10. The parameters of the first video stream VS1 such as the video resolution, the frame rate and the compression and coding method, etc. can be preset in the video processing unit 120, or after the connection processing unit 130 is connected to an electronic device (for example, a smart phone, a tablet PC or a notebook, etc.) through the Internet, setting of the parameters such as the resolution, the frame rate and the compression and coding method of the video stream adapted to the electronic device is first obtained from the electronic device, and then the connection processing unit 130 transmits the parameters to the video processing unit 120 for setting.

In an embodiment of the invention, the video processing unit 120 can simultaneously generate four, eight or more video streams with different resolutions and/or compression and coding formats according to the images MI captured by the image capturing unit 110. The connection processing unit 130 processes the above multiple video streams into packet streams according to an actual requirement and transmits the same to a specified network address or a device directly connected to the IP camera 10, for example, the aforementioned external electronic device.

On the other hand, in an embodiment, the IP camera 10 does not keep transmitting two (or more) video streams simultaneously, but is changed along with the connected links of the connection processing unit 130, and when the corresponding link exists, the video processing unit 130 generates the corresponding video stream.

For example, when the connection processing unit 130 is disconnected with the local area wireless network unit, but is connected with the external electronic device 210 (i.e., the first wireless link is interrupted, and the second wireless link is maintained), the connection processing unit 130 transmits a notification signal to the video processing unit 120, and the video processing unit 120 receives the notification signal to only generate the second video stream VS2, such that the connection processing unit 130 only transmits the second packet stream PS2 to the external electronic device. When the connection processing unit 130 is connected to the local area wireless network unit, but is disconnected with the external electronic device 210 (i.e., the first wireless link is maintained, and the second wireless link is interrupted), the connection processing unit 130 transmits a notification signal to the video processing unit 120, and the video processing unit 120 receives the notification signal to only generate the first video stream VS1, such that the connection processing unit 130 only transmits the first packet stream PS1 to the Internet. In case that the number of links of the connection processing unit 130 is greater than 2, and/or the number of the video streams generated by the video processing unit 120 is greater than 2, the aforementioned embodiment can be referred for implementation.

Figure 2:
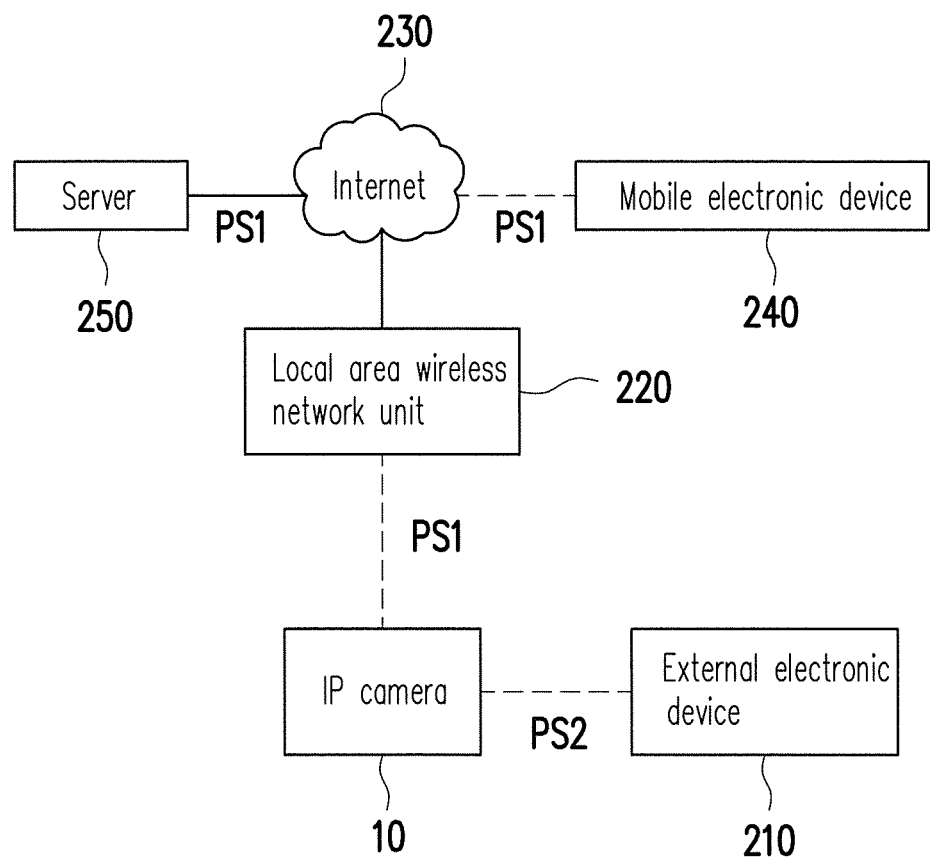
FIG. 2 is a system block diagram of a communication system according to an embodiment of the invention.

FIG. 2 is a system block diagram of a communication system according to an embodiment of the invention. Referring to FIG. 2, the communication system 20 includes the external electronic device 210, a local area wireless network unit 220 and the IP camera 10. The external electronic device 210 has a display screen. The local area wireless network unit 220 is connected to the Internet 230. The connection relationship between various devices of the present embodiment is basically the same with that of the embodiment of FIG. 1, and the IP camera 10 is connected to the local area wireless network unit 220 through a first wireless link and is connected to the external electronic device 210 through a second wireless link, and respectively transmits the first packet stream PS1 to the local area wireless network unit 220 and transmits the second packet stream PS2 to the external electronic device 210. When the external electronic device 210 receives the second packet stream PS2, the display screen of the external electronic device 210 displays an image content of the second packet stream PS2 (i.e., the images capered by the image capturing unit 110 of the IP camera 10). The first packet stream includes the first video stream, the second packet stream includes the second video stream, and the first video stream and the second video stream correspond to the same image content.

In the present embodiment, the communication system 20 further includes a mobile electronic device 240. When the IP camera 10 is connected to the Internet 230 through the local area wireless network unit 220, the mobile electronic device 240 connected to the Internet 230 can access the first packet stream PS1 after identifying the network address of the IP camera 10, so as to display the image content of the first video stream.

When the local area wireless network unit 220 is in a private network using a network address translation (NAT) technique, the mobile electronic device 240 cannot directly establish the connection with the IP camera 10, and cannot directly access the transmitted first packet stream PS1. In an embodiment of the invention, the communication system 20 further includes a server 250 connected to the Internet 230, and the mobile electronic device 240 can access the first packet stream PS1 through hole punching by using a user datagram protocol (UDP) via the server 250. For example, when the IP camera 10 is connected to the Internet 230 through the local area wireless network unit 220, the IP camera 10 is connected to the server 250 and keeps the connection, and when a user of the mobile electronic device 240 wants to view the image content of the first packet stream PS1, the mobile electronic device 240 can connect the server 250 to obtain the first packet stream PS1.

Figure 3:
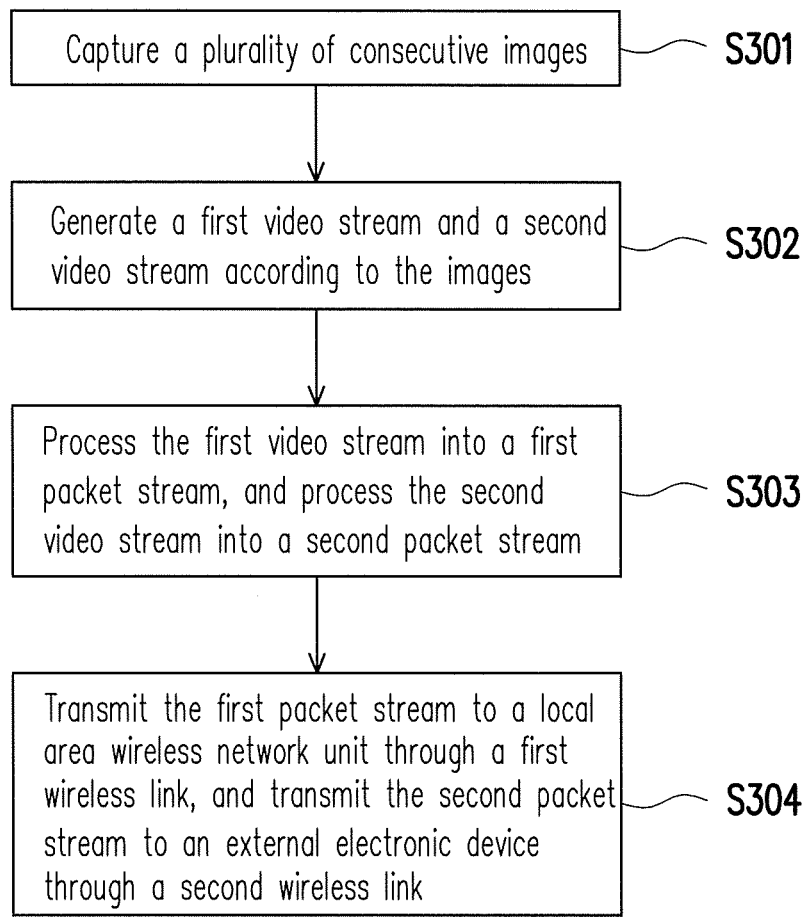
FIG. 3 is a flowchart illustrating a communication method according to an embodiment of the invention.

The invention provides a communication method, which is adapted to an IP camera, for example, the IP camera 10 of FIG. 1 and FIG. 2. FIG. 3 is a flowchart illustrating a communication method according to an embodiment of the invention. Referring to FIG. 3, first, in step S301, a plurality of consecutive images are captured. Then, in step S302, a first video stream and a second video stream are generated according to the images. Then, in step S303, the first video stream is processed into a first packet stream, and the second video stream is processed into a second packet stream. In step S304, the first packet stream is transmitted to a local area wireless network unit through a first wireless link, and the second packet stream is transmitted to an external electronic device through a second wireless link. Detailed implementation of the communication method may refer to the descriptions of the embodiments of FIG. 1 and FIG. 2, and details thereof are not repeated.

In summary, the invention provides an IP camera, a communication method and a communication system. The IP camera simultaneously generates a plurality video streams corresponding to the same image content, and respectively transmits the same to a plurality of electronic devices through wireless links or the Internet for playing. For example, a user located far away from the IP camera can directly (or indirectly through a third party server) receive the video stream generated by the IP camera through the Internet by using a computer or a mobile electronic device (for example, a smart phone, a tablet PC, etc.), so as to achieve a monitoring effect by using the IP camera. A user located near the IP camera or a user who is not good at operating the electronic device can directly use an electronic device (i.e., the aforementioned external electronic device) attached to the IP camera to receive and view the image content captured by the IP camera, for example, the user can monitor a status of a child or an elder in bedroom from a living room or a kitchen. Although the IP camera can be connected to the external electronic device and the Internet through WiFi, since the IP camera can transmit the video streams by using different encryption methods, problems of mutual interference and data reception chaos are avoided.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An IP camera, comprising:
an image capturing apparatus, capturing a plurality of consecutive images;
a video processor, coupled to the image capturing apparatus, and generating a first video stream and a second video stream according to the images simultaneously, wherein coding methods, frame rates and resolutions of the first video stream and the second video stream are different; and
a connection processor, coupled to the video processor, processing the first video stream into a first packet stream, and processing the second video stream into a second packet stream,
wherein the connection processor transmits the first packet stream to a local area wireless network unit through a first wireless link, and the connection processor transmits the second packet stream to an external electronic device through a second wireless link, the coding methods, the frame rates and the resolutions of the first video stream and the second video stream are respectively determined by the video processor at least according to setting parameters from the local area wireless network unit and the external electronic device.

2. The IP camera as claimed in claim 1, wherein
when the connection processor determines that the first wireless link exists, the connection processor transmits a first notification signal to the video processor to generate the first video stream; and
when the connection processor determines that the second wireless link exists, the connection processor transmits a second notification signal to the video processor to generate the second video stream.

3. The IP camera as claimed in claim 1, wherein
the first wireless link and the second wireless link are complied with a wireless network standard; and
the connection processor encrypts the first packet stream by using a first encryption method, and encrypts the second packet stream by using a second encryption method, wherein the first encryption method and the second encryption method are different.

4. The IP camera as claimed in claim 3, wherein
the connection processor sets the second wireless link in a raw socket manner, and designates the second encryption method and designates to link the external electronic device by using the raw socket manner.

5. A communication method, adapted to an IP camera, comprising:
capturing a plurality of consecutive images;
generating at least one of a first video stream and a second video stream according to the images, wherein
generating the first video stream in response to determining that a first wireless link with a local area wireless network exists, wherein only the first video stream is generated when only the first wireless link exists; and
generating the second video stream in response to determining that a second wireless link with an external network exists, wherein only the second video stream is generated when only the second wireless link exists;
processing the first video stream into a first packet stream when the first wireless link exists, and processing the second video stream into a second packet stream when the second wireless link exists; and
transmitting the first packet stream to a local area wireless network unit through the first wireless link, and transmitting the second packet stream to an external electronic device through the second wireless link,
the step of generating at least one of the first video stream and the second video stream further comprises:
at least according to setting parameters from the local area wireless network unit and the external electronic device, respectively determining coding methods, frame rates and resolutions of the first video stream and the second video stream.

6. The communication method as claimed in claim 5, wherein
the coding methods, the frame rates and the resolutions of the first video stream and the second video stream are different.

7. The communication method as claimed in claim 5, wherein
the first wireless link and the second wireless link are complied with a wireless network standard; and
the step of processing the first video stream into the first packet stream, and processing the second video stream into the second packet stream comprises:
encrypting the first packet stream by using a first encryption method, and encrypting the second packet stream by using a second encryption method, wherein the first encryption method and the second encryption method are different.

8. The communication method as claimed in claim 7, wherein the step of transmitting the second packet stream to the external electronic device through the second wireless link comprises:

setting the second wireless link in a raw socket manner, and designating the second encryption method and designating to link the external electronic device by using the raw socket manner.

9. A communication system, comprising:

an external electronic device, having a display screen;

a local area wireless network unit, connected to the Internet; and an IP camera, connecting the local area wireless network unit through a first wireless link and connecting the external electronic device through a second wireless link, and respectively transmitting a first packet stream to the local area wireless network unit and transmitting a second packet stream to the external electronic device, wherein when the external electronic device receives the second packet stream, the display screen displays an image content of the second packet stream, wherein the first packet stream comprises a first video stream, the second packet stream comprises a second video stream, the first video stream and the second video stream are generated simultaneously according to the same image content, and coding methods, frame rates and resolutions of the first video stream and the second video stream are different, the coding methods, the frame rates and the resolutions of the first video stream and the second video stream are respectively determined at least according to setting parameters from the local area wireless network unit and the external electronic device.

10. The communication system as claimed in claim 9, wherein the first wireless link and the second wireless link are complied with a wireless network standard; and the IP camera encrypts the first packet stream by using a first encryption method, and encrypts the second packet stream by using a second encryption method, wherein the first encryption method and the second encryption method are different.

11. The communication system as claimed in claim 9, further comprising:

a mobile electronic device, connected to the Internet, and receiving the first packet stream from a network access point through the Internet.

12. The communication system as claimed in claim 9, further comprising:

a server, connected to the Internet, wherein the IP camera transmitting the first packet stream to the server through a network access point; and a mobile electronic device, connected to the Internet, and receiving the first packet stream from the server through the Internet.

* * * * *